United States Patent [19]
Murphy

[11] Patent Number: 5,640,452
[45] Date of Patent: Jun. 17, 1997

[54] LOCATION-SENSITIVE DECRYPTION OF AN ENCRYPTED MESSAGE

[75] Inventor: Michael D. Murphy, Sunnyvale, Calif.

[73] Assignee: Trimble Navigation Limited, Sunnyvale, Calif.

[21] Appl. No.: 430,415

[22] Filed: Apr. 28, 1995

[51] Int. Cl.$^6$ .................................................. H04N 7/167
[52] U.S. Cl. .................................................. 380/5; 380/20
[58] Field of Search .................................. 380/3, 4, 5, 10, 380/20, 23, 49, 21

[56] References Cited

U.S. PATENT DOCUMENTS

| | | | |
|---|---|---|---|
| 4,102,521 | 7/1978 | Hermann | 244/2.11 |
| 4,117,271 | 9/1978 | Teeter et al. | 179/82 |
| 4,205,343 | 5/1980 | Barrett | 358/147 |
| 4,222,067 | 9/1980 | Stern et al. | 358/118 |
| 4,286,288 | 8/1981 | Waldo | 358/114 |
| 4,709,266 | 11/1987 | Hanas et al. | 380/20 |
| 4,710,955 | 12/1987 | Kauffman | 380/10 |
| 4,712,239 | 12/1987 | Frezza et al. | 380/20 |
| 4,739,510 | 4/1988 | Jeffers et al. | 380/15 |
| 4,823,386 | 4/1989 | Dumbauld et al. | 380/13 |
| 4,887,296 | 12/1989 | Horne | 380/21 |
| 4,912,760 | 3/1990 | West et al. | 380/7 |
| 4,916,737 | 4/1990 | Chomet et al. | 380/20 |
| 4,932,057 | 6/1990 | Kolbert | 380/33 |
| 4,947,428 | 8/1990 | Guillou et al. | 380/20 |
| 4,972,431 | 11/1990 | Keegan | 380/9 |
| 4,993,067 | 2/1991 | Leopold | 380/21 |
| 5,014,309 | 5/1991 | West | 380/7 |
| 5,036,537 | 7/1991 | Jeffers et al. | 380/20 |
| 5,349,459 | 9/1994 | Reed | 359/142 |
| 5,363,448 | 11/1994 | Koopman et al. | 380/23 |
| 5,382,957 | 1/1995 | Blume | 342/43 |

*Primary Examiner*—David C. Cain
*Attorney, Agent, or Firm*—John Schipper

[57] ABSTRACT

A system for assuring the location integrity of a decryption chip used to receive and decrypt encrypted signals ES received from an encrypted signal source. The decryption chip operates in association with a licensed signal receiver and is licensed for use at a selected site or location $L_i$ and is positioned adjacent to a Satellite Positioning System (SATPS) antenna and receiver/processor that determine the present location L of this antenna. If the SATPS-determined location L is within a region $R(L_i;d_i)$, centered at the location $L_i$ and having a selected diameter $d_i$, and if the signal ES is associated with a channel that is authorized for reception by this signal receiver, the deception chip is enabled, and the signal ES is decrypted for audible or visual display on the signal receiver. Otherwise, the decryption chip does not decrypt the incoming signal ES. The licensed site location $L_i$ can be changed and the group of channels for which signal receipt and decryption is authorized can be changed. This system can operate on encrypted television signals and other similar signals. The SATPS may be a Global Positioning System (GPS) or a Global Orbiting Navigational Satellite System (GLONASS), or another suitable satellite-based location determination system.

18 Claims, 3 Drawing Sheets

LOCATION-SENSITIVE DECRYPTION OF AN ENCRYPTED MESSAGE

FIELD OF THE INVENTION

This invention relates to control of decryption of an encrypted message, based upon the location where such decryption is performed.

BACKGROUND OF THE INVENTION

Satellite (re)transmission of a restricted distribution television program relies upon transmission of an encrypted version of the program. The encrypted program is decrypted at the television receiver by a decryption chip or module that is provided for legitimate subscribers. Unfortunately, these decryption chips are often cloned without authorization, and the satellite television broadcasting industry estimates that as much as $8 billion in potential revenues is lost annually because of these clones. Various signal encryption schemes have been proposed by workers in this field.

Hermann, in U.S. Pat. No. 4,102,521, discloses a system for coding guidance signals that are produced at a central station and transmitted to a self-propelled vehicle, such as a missile or guidable satellite, that is to be guided or whose control surfaces are to be adjusted from time to time. The length of the coded signal is kept low, and transmission of the coded signal is immediately preceded by transmission of a noise signal with uniform power density per unit frequency interval, to frustrate attempts to jam or interfere with transmission and receipt of the coded signal. The coded signal, when received by the vehicle, is decoded and applied to guide or control the vehicle. The concern here is interference with receipt by the intended recipient (the vehicle) of the transmitted message, not receipt and comprehension of the guidance signal by some other entity. Coding and anti-interference measures, but not encryption and decryption, are employed.

Teeter et al disclose use of pseudo-noise modulations and specific address encoding to permit multiple conversations or signal transmissions between a central station and a plurality of vehicles, or between the vehicles, in U.S. Pat. No. 4,117,271. A receiver for such (broadcast) signals is provided with a filter that accepts only signals with the proper address coding and disposes of all other messages. The encoded address also identifies the source of the message. The invenfors note that this technique is useful only over modest ranges and that the most suitable frequency range is tens of kilohertz up to tens of megahertz.

U.S. Pat. No. 4,205,343, issued to Barrett, discloses transmission of an enciphered television signal during a field blanking interval that can be received, recognized and deciphered by a viewer with an authorized signal decoder and deciphering key. A subset of television viewers, those with the decoder and particular key, can be addressed for particular messages or programs.

Stern et al, in U.S. Pat. No. 4,222,067, disclose a tamper-resistant subscription television signal descrambling system in which a security carrier signal causes a television receiver to receive a selected program or an adjacent channel program, depending on whether the subscriber is or is not authorized to receive the selected program. If the viewer attempts to tamper with the descrambling system, to retune the receiver to receive a program on an unauthorized channel, the security carrier signal interferes with and blocks reception of comprehensible signals on the unauthorized channel.

Provision of a television signal filter, arranged for maximum attenuation for channels that a receiver is not authorized to receive, is disclosed by Waldo in U.S. Pat. No. 4,286,288. Authorized channel signals have little or no attenuation. Any attempt to disable the filter results in blockage of signals on all channels.

Encryption using destination addresses using a TDMA satellite communications system is disclosed in U.S. Pat. No. 4,418,415, issued to Fennel et al. A common encryption/decryption key is held by all authorized users of a network. This key is EXclusively ORed with the specified destination address, and the output (digital) signal is passed through an encryption engine, on the satellite and at the intended ground-based receiver, using the same key or another key. The encryption engine output signal is then combined with the channel data to be transmitted in another EXclusive OR circuit and transmitted to the network users. Each of the receivers receives the message and reverses the encryption process, using its own destination address as part of the decryption key. However, only the (single) intended receiver produces a cleartext message that is comprehensible.

Hanas et al, in U.S. Pat. No. 4,709,266, disclose use of a satellite scrambling network to provide messages that are scrambled or encrypted differently for different geographical regions. This is useful for distributing scrambled video, voice and data subscriber messages. A master uplink message (ground-to-satellite) is used to control the scrambling or encryption commands that determine the scrambling applied to each geographical area and/or to groups of individual subscribers.

A cable television subscriber system with two-way telephone communication is disclosed in U.S. Pat. No. 4,710,955, issued to Kauffman. When a receiver transmits a request to view a particular television program, the headend determines if sufficient credits are available to pay for viewing the requested program. The requested program signals are descrambled only if sufficient credits are available.

A cable television security arrangement disclosed in U.S. Pat. No. 4,712,239, issued to Frezza et al, attaches a bootable checksum to the requested program signals transmitted to a requesting receiver. The receiver compares the received checksum with a checksum stored at the receiver. The signal descrambler is enabled only if the two checksums agree.

U.S. Pat. No. 4,739,510, issued to Jeffers et al, discloses insertion of digitized audio and control signals in the horizontal blanking intervals of a television signal. The control signals appear as frames or packets, with a header containing a group address, synchronization and program-related information. A second portion of the header, containing control information addressed only to one or more specified receiver units, allows control of certain receiver functions at the transmission end of the system. The system uses several tiers of message authorization levels and a common audio or video key that is encrypted differently for use by each receiving authorized receiver. An authorized receiver receives only the information intended for that receiver, and unauthorized receivers receive only a scrambled message.

A cable television system with signal descrambling circuits located remote from the subscriber's premises is disclosed by Dumbauld et al in U.S. Pat. No. 4,823,386. When a receiver requests viewing of a particular channel, the requested channel is compared with a list of channels authorized for viewing by that receiver. Signal descrambling occurs only if the requested channel is on the authorized list.

Horne, in U.S. Pat. No. 4,887,296, discloses a three-key cryptographic system for a direct broadcast satellite system, to be used in video broadcasting to a plurality of ground-based receivers, each having a unique address number. A signature key, which is an encryption using the address number for that receiver, is stored in the receiver at the time of manufacturing. At the transmitter, a common key is encrypted, using the unique signature key for a receiver that is targeted for a portion of the message to be transmitted. The data stream contains message portions intended for all receivers and message portions intended for, and decryptable only by, individual receivers. A target receiver decrypts its messages, using the common key and signature key used by the transmitter to encrypt the receivers portions of the message.

Use of frequency hopping for transmission of cleartext cable television signals is disclosed in U.S. Pat. Nos. 4,912,760 and 5,014,309, issued to West et al. An assembly of off-premises voltage-controlled oscillators provides jamming of the transmitted signal for a requesting receiver if that receiver is not authorized to receive that program, as determined at the head end or at the VCO assembly. Use of addressable, remotely located signal traps or jammers for program signals transmitted in the clear is also disclosed by Barany in U.S. Pat. No. 4,937,865.

U.S. Pat. No. 4,916,737, issued to Chomet et al, discloses an anti-piracy television program scrambling/descrambling system that allows the encryption/decryption code to be changed periodically (e.g., once per month) by communication from the head end or central station. The receiver's decryption unit has an unalterable ROM portion, containing its unique serial or address number, and an EPROM portion, containing an alterable ROM portion with a look-up table that can be changed by receipt of special signals from the head end.

Kolbert discloses use of parallel transmission of "real" data and "junk" data to all recipients, to mask which user is the intended recipient of a message, in U.S. Pat. No. 4,932,057. The system is intended to be used where several different systems on an aircraft (e.g., communication, navigation, visual display) receive different subsets of data, some of which are confidential. The radiation produced by transmission along hardwired circuits in parallel allegedly masks the message and the intended recipient.

Transmission of a television program signal together with a general addressing control message and a shared or special addressing control message is disclosed by Guillou et al in U.S. Pat. No. 4,947,428. The special message determines which receivers can view the transmitted signal and is reconfigurable at any time.

U.S. Pat. No. 4,972,431, issued to Keegan, discloses a method of decryption of encrypted P-code signals in a Global Positioning System (GPS). The encrypted binary signals are squared using a relatively narrow bandwidth so that each GPS satellite signal can be separated from the other signals and so that the GPS carrier phase and pseudorange signals can be recovered from the composite signal. The signal-to-noise ratio is kept reasonably high so that very weak signals can be received and analyzed.

An encrypted satellite communications system with relatively easy rekeying is disclosed by Leopold in U.S. Pat. No. 4,993,067. The contemplated systems provides communications between a satellite and all ground receivers in a defined geographic area. A message received by or from a receiver located in an improper receiver area is discarded. A designated ground receiver transmits a rekeying request to the satellite. The satellite determines whether the rekeyed areas correspond to geographically permitted areas. If the answer is affirmative, the satellite transmits rekeying instructions to change the geographical configuration of the ground-based receivers, either immediately or at a previously selected time.

Geographically defined lock-out of direct broadcast satellite signals, such as pay-per-view television, is also disclosed by Jeffers et al in U.S. Pat. No. 5,036,537. Before the broadcast, each receiver in the geographic area intended to be locked out is addressed and prevented from receiving that broadcast, using a blackout tier system that determines which receivers are to be locked out, based upon a designation code assigned to that receiver.

U.S. Pat. No. 5,113,443, issued to Brockman, discloses a method for scrambling a satellite communication by (1) encoding and modulating different portions of the communication signals onto different carrier frequencies to form a total signal and (2) transmitting the total signal to a ground station using the different frequency channels. The ground station receives the transmitted signal, decodes the individual channel signals using the known carrier frequencies, and accumulates the signal as a decoded whole. Only an authorized ground station possessing a key can decode and properly sum the received signals to produce the message originally transmitted from the satellite.

Esserman et al disclose signal encryption apparatus for satellite communications that generates a plurality of distinct keys, in U.S. Pat. No. 5,115,467. A secret common key is combined with distinct parameter data (unique to a particular station) to produce a distinct key for communications transmitted to that station.

A global communications system for transmitting encrypted messages to each of a plurality of different geographic areas is disclosed by Davis et al in U.S. Pat. No. 5,129,095. One or more satellites communicates with ground stations in each distinct geographic area by use of identification words on different channels. The system is intended for use in paging selected users in a plurality of countries.

In U.S. Pat. No. 5,221,925, Cross discloses a location interrogation system in which a mobile unit, upon receipt of an interrogation signal, transmits its present location in a conventionally encoded format to a central station that has issued the interrogation signal, to assist in tracking the mobile unit.

Bestler et al, in U.S. Pat. No. 5,231,664, disclose provision of a descrambling authorization signal in the vertical blanking intervals during transmission of a scrambled cable television program. A decoder at a requesting receiver examines the authorization signal, determines if this receiver is authorized to receive this program or channel, and descrambles the transmitted program signal only if this receiver is so authorized.

A verification procedure for mobile stations in a cellular network is disclosed by Raith in U.S. Pat. No. 5,237,612. In response to receipt of a random challenge signal or interrogation, the mobile station transmits to the central station a first response signal, depending only upon an unchanging, commonly-held encryption key, and a second response signal, dependent upon a changeable encryption key. The first and second response signals are analyzed by an authentication algorithm to authenticate, or deny authentication to, the putative mobile station.

A communication system for control of access to a location-sensitive remote database is disclosed in U.S. Pat. No. 5,243,652, issued to Teare et al. A central station stores and transmits encrypted television material whose encryption key is available only for a viewers in a specified geographical area, as determined by a GPS or Loran location determination system.

Transmission of encrypted information packages from a central site to a remote site, in response to receipt of a request for specified information from that site, is disclosed in U.S. Pat. No. 5,247,575, issued to Sprague et al. The encryption key is changed periodically (e.g., weekly) and does not depend upon any past information.

Goldfine et al disclose a financial or telephone service transaction authentication system, in U.S. Pat. No. 5,343,529, in which any attempt to gain access to a protected system is thereafter answered and controlled by a centralized authentication agency. In response, the agency issues an identification request, requesting information that is unique to that request; a subsequent attempt by that person to gain access would require submission of different information. If the information supplied by the access seeker matches the information on file, the access seeker identity is authenticated and access is granted.

In U.S. Pat. No. 5,347,580, Molva et al disclose an authentication method using a smartcard to encrypt the presently displayed time with a cryptographically strong key. A public work station receives the encrypted time message, generates one or more values from this message, and further encrypts and/or transmits these values to a server station. The server station uses the received values to authenticate the holder of the smartcard and to accept or reject a message or command from the holder.

A remote control transmitter-receiver pair that cooperatively implement a code transmission sequence that minimizes energy use and protects the communication channel from unauthorized access is disclosed in U.S. Pat. No. 5,349,459, issued to Reed. The transmitter issues a specified sequence of start/stop pulses of different lengths, similar to pulse code modulation, which are received by the receiver and compared with a copy of this sequence. If the sequences agree, the receiver authenticates the transmitter and opens the secured channel to receive the remainder of the message.

Generation of two pseudorandom numbers, each generated by an independently chosen number of iterations, is the basis for a cryptographic authentication system disclosed by Koopman et al in U.S. Pat. No. 5,363,448. The two pseudorandom numbers are concatenated and encrypted into a single word. This word is transmitted by or on behalf of a person seeking access to a protected system, and the word is decrypted and deconcatenated to produce the two pseudorandom numbers, for comparison and authentication purposes. Immediately after the concatenated and encrypted word is received, the receiving system locks out receipt of any additional signals for a selected time interval, such as 0.5 sec. Thus, breach of the protected system by rapid, exhaustive, numerical trials is made difficult or impossible.

Blume discloses a system to allow a space platform to distinguish between a friendly object and an unfriendly object in U.S. Pat. No. 5,382,957. The platform, which includes a GPS receiver/processor and antenna, transmits an encrypted interrogation signal to the object, which can be positioned tens or hundreds of kilometers from the platform, requesting certain information including the location coordinates of the object. Simultaneously, the platform uses high directivity radar and line of sight measurements to estimate the object range and the object location coordinates, using the platform's GPS-based knowledge of its own location. A friendly object will reply to the encrypted interrogation signal with an authenticating reply, including the GPS-determined location coordinates of the object. A receiver on the platform receives the object location coordinates from the object and compares these coordinates with its own estimate of the object location coordinates. If the object-supplied object location is within a determinable distance of the platform-supplied object location and all other authenticating replies from the object are appropriate, the platform authenticates the object as a "friendly" object.

Several of these approaches provide an encryption method that may be used to withhold decryption of an encrypted message for a receiver not in a geographically selected region, such as a time zone (roughly 1,200–1,600 kilometers in a direction measured parallel to the equator) or selected broadcast zone. However, none of these approaches provides a method for withholding decryption of an encrypted message by a receiver that is not within a small distance D, such as 200 meters or less, of a selected location. To achieve this with many of the approaches summarized above would require provision of an enormous number of special codes, with a unique code being provided for each individual receiver. Further, most of these approaches would require replacement or extensive reconfiguring of a decryption system, if a change in the group of authorized channels or in the group of unauthorized channels is to be implemented. Further, most of these approaches are applicable to cable transmission but not to over-the-air transmission of the program signals. What is needed is an approach that allows decryption of an encrypted over-the-air a cable message to be withheld at any otherwise-appropriate receiver that is not within a selected small distance D of a licensed site or location for receipt and viewing of the message or program. This approach should not require provision of a separate code for each receiver, and the location of a licensed site should be easily changeable without major surgery on the signal transmission system. This approach should allow easy reconfiguring of the decryption system to allow relocation of an authorized receiver and to implement a change in the group of authorized channels or in the group of unauthorized channels.

SUMMARY OF THE INVENTION

These needs are met by the invention, which provides each decryption chip with a built-in Satellite Positioning System (SATPS) including an SATPS signal antenna and an SATPS signal receiver/processor that (1) determines the present location of the antenna, (2) compares this present location with a licensed site location, stored in the receiver/processor for that particular chip, and (3) shuts down or disables the signal decryption routine if the SATPS-determined present location of the antenna is outside a selected region $R(L_i;d_i)$ with a selected diameter $d_i$ (such as 20 or 200 meters) that is centered at the declared location $L_i$ of the site that is licensed to use this chip. The receiver/processor may also be provided with a radiowave distress call generator, set at a narrowly defined frequency or combination of frequencies, that broadcasts this distress call whenever the antenna present location is determined to be outside the region $R(L_i;d_i)$. The SATPS antenna and receiver/processor and the decryption chip are parts of a non-breachable unit for which the decryption chip is destroyed if an attempt is made to decode, disassemble or modify the unit. An authorized decryption chip is easily reconfigured (1) to prescribe a new site location $L_i$ to which an authorized receiver is to be moved and (2) to prescribe a change in the group of authorized channels or in the group of unauthorized channels. The invention is intended to maintain the "location integrity" of a signal decryption chip by requiring that the chip be used only within a narrowly prescribed geographical region surrounding a specified site or location. The invention is not limited to receipt of restricted distribution television programs and can be used for controlling the distribution of any over-the-air radiowave signals, where signal reception is authorized for specified locations or sites.

DESCRIPTION OF BEST MODE OF THE INVENTION

Figure 1:
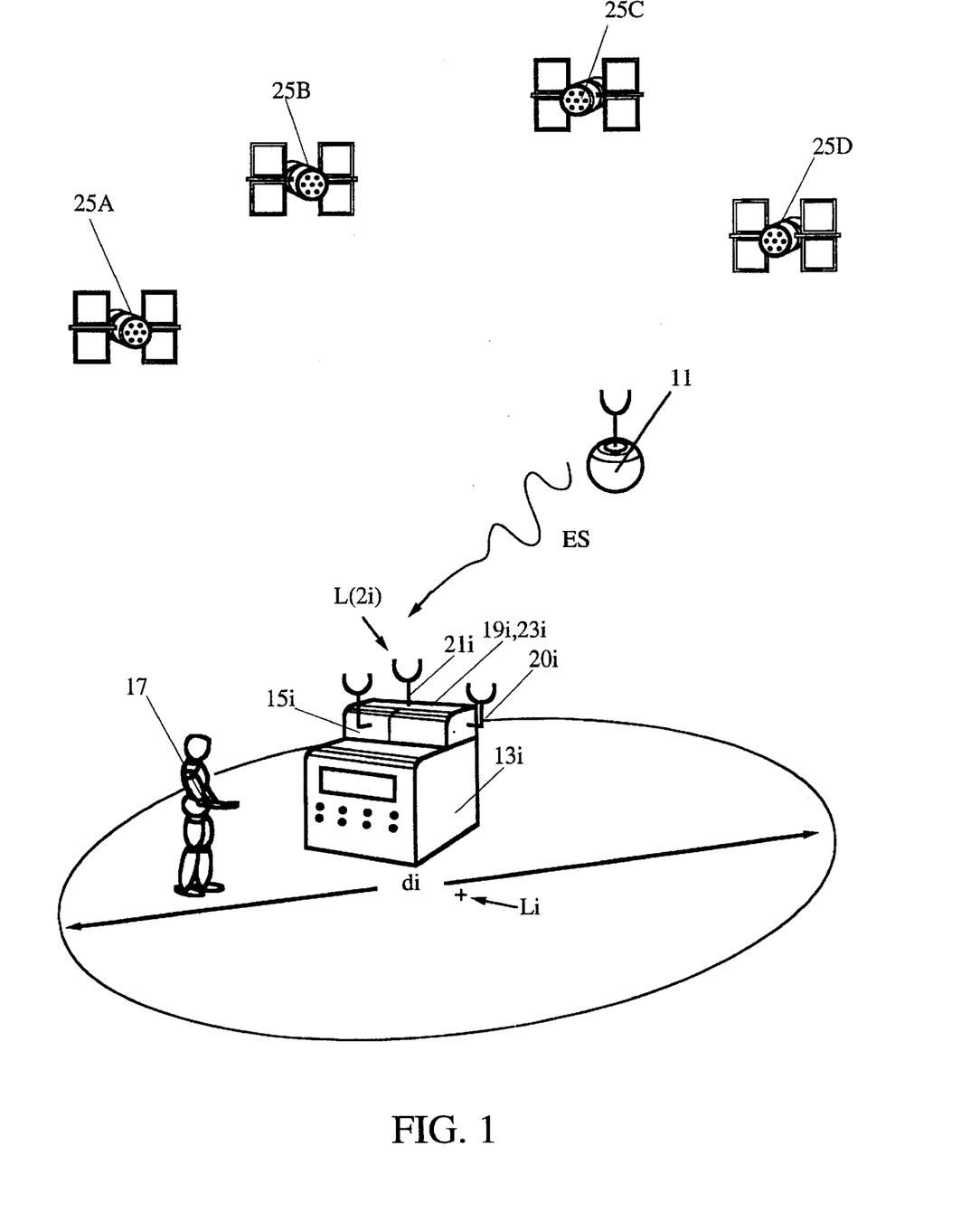
FIG. 1 illustrates a situation in which the invention can be used.

FIG. 1 illustrates one situation in which the invention can be used. One or more satellites 11 transmits or retransmits an encrypted signal ES to one or more licensed sites or locations $L_i$ ($i=1, 2, \ldots$) that are authorized to receive this signal on a receiver 13$i$. An authorized receiver 13$i$ includes a decryption chip 15$i$ that receives and decrypts the encrypted signal ES and provides a decrypted signal S suitable for audible and/or visual display by the receiver 13$i$. Without this decryption chip 15$i$, or an unauthorized copy of this chip, the receiver 13$i$ will not decrypt the signal ES and the receiver will, at best, audibly and/or visually display a signal that is incomprehensible by a user 17 of the receiver 13$i$.

The signal ES may be a closed circuit television signal, received via satellite or cable signal retransmitters, and the receiver 13$i$ may be operated by a subscriber that periodically pays a fee to the originator of the signal ES to continue to receive this encrypted signal for entertainment, educational or informational purposes. Alternatively, the signal ES may be a closed circuit radiowave signal that an emergency worker receives through the receiver 13$i$ at selected times when this worker is called upon to perform emergency work, such as fire control, toxic substance containment and cleanup, or other disaster management and control duties. Alternatively, the signal ES may be an educational or informational message whose communication is restricted to selected receivers 13$i$, based on age, need to know, previous training or some other relevant characteristic. Recitation of these uses of the encrypted signal ES is not intended to limit the purposes for which receipt of the encrypted signal may be used.

A location determination and decryption module 19$i$ containing the encryption chip 15$i$ also includes a Satellite Positioning System (SATPS) antenna 21$i$ and associated SATPS receiver/processor 23$i$ that receive and process SATPS signals from three or more SATPS satellites 25A, 25B, 25C, 25D that are "visible" from the antenna 21$i$. Two suitable SATPSs are the Global Positioning System (GPS) and the Global Orbiting Navigational Satellite System (GLONASS), each of which is discussed in detail later. The SATPS receiver/processor 23$i$ has the location coordinates ($x_i, y_i, z_i$) of the licensed site $L_i$ stored therein and a diameter $d_i$ or radius $r_i$ of a region $R(L_i;d_i)$ that is in some sense "centered" at the location with location coordinates ($x_i, y_i, z_i$). The diameter $d_i$ of the region $R(L_i;d_i)$ may be any suitable distance, such as 20 meters, 200 meters or 1000 meters, that takes into account the inherent inaccuracy of the SATPS antenna 21$i$ and receiver/processor 23$i$ and the physical extent of the site where the decryption chip 15$i$ is authorized to be used. The diameter $d_i$ may vary with the location of the site $L_i$ and may vary with the circumstances at that site.

When the receiver 13$i$ is activated by a user 17, the SATPS antenna 21$i$ and receiver/processor 23$i$ first determine the present location $L(21i)$ of the antenna 21$i$, using SATPS signal analysis techniques. The receiver/processor 23$i$ then compares the present location $L(21i)$ with the stored location coordinates ($x_i, y_i, z_i$) of the licensed site $L_i$. If the present location $L(21i)$ of the SATPS antenna 21$i$ is within the region $R(L_i;d_i)$, the SATPS receiver/processor 23$i$ activates the encryption chip 15$i$, and this decryption chip decrypts the incoming signal ES for audible and/or visual display on the receiver 13$i$. If the present location $L(21i)$ of the SATPS antenna 21$i$ is not within the region $R(L_i;d_i)$, the SATPS receiver/processor 23$i$ activates a radiowave generator 29$i$, preferably also part of the module 19$i$, that transmits a silent radiowave distress call $DC(L(21i))$ that informs a local commercial enforcement agency (1) that a decryption chip 15$i$ is being used at an unauthorized location and (2) the location coordinates of the unauthorized location $L(21i)$. The agency can then retrieve the decryption chip 15$i$, using legal or extra-legal procedures.

An authorized decryption chip 15$i$ is easily reconfigured to change the licensed site location $L_i$, by changing the location coordinates of the location $L_i$ and/or the diameter $d_i$ in an authorized manner. Change of the location coordinates of the location $L_i$ can be implemented using circuitry and/or software that is built into the decryption chip 15$i$ or the SATPS receiver/processor 23$i$ or can be implemented by a separate location adjustment module 24i. This allows an authorized receiver and decryption chip to be moved to another (new) licensed site, if desired. An authorized decryption chip can also be easily reconfigured to change the group of channels a receiver is authorized, or not authorized, to receive, using an approach illustrated in FIG. 2.

Figure 2:
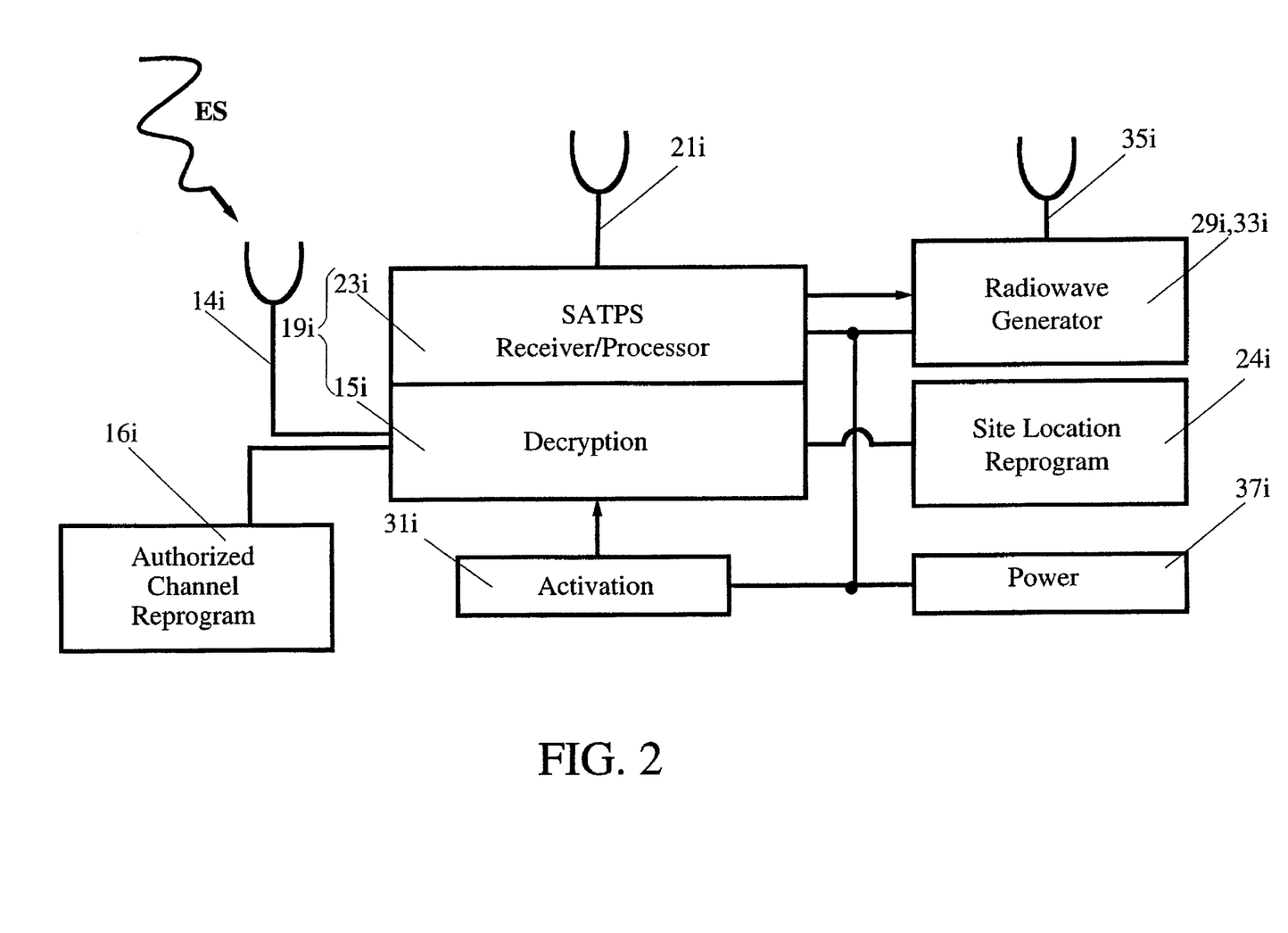
FIG. 2 is a schematic view of apparatus that can be used to practice the invention.

FIG. 2 illustrates one embodiment of the module 19$i$ that provides decryption of the incoming encrypted signal ES. The module 19$i$ optionally includes an activation switch 31$i$ by which the user 17 seeks to activate the decryption chip 15$i$. Alternatively, the module 19$i$ can always be in an activated state. The SATPS antenna 21$i$ and receiver/processor 23$i$ receive SATPS signals from the plurality of SATPS satellites 25A, 25B, 25C, 25D and determine the present location $L(21i)$ of the SATPS antenna 21$i$. When the module 19$i$ is first activated, or is reactivated after an interruption of a supply of electrical power to this module, the decryption chip 15$i$ is not activated until the SATPS receiver/processor 23$i$ (1) compares the location coordinates of the antenna location $L(21i)$ with the location coordinates of the licensed site $L_i$ and (2) confirms that the antenna location $L(21i)$ is within a distance $d_i/2$ of the licensed site $L_i$. As noted above, if the present location $L(21i)$ of the SATPS antenna 21$i$ is not within the region $R(L_i;d_i)$, the SATPS receiver/processor 23$i$ activates the radiowave generator 29$i$. The radiowave generator 29$i$ transmits a silent radiowave distress call $DC(L(21i))$, using a transmitter 33$i$ and antenna 35$i$, that informs a local commercial enforcement agency (1) that a decryption chip 15$i$ is being used at an unauthorized location and (2) the location coordinates of the unauthorized location $L(21i)$. A power supply 37$i$ provides power for one or more of the decryption chip 15$i$, the SATPS antenna 21$i$, the SATPS receiver/processor 23$i$, the radiowave generator 29$i$, the activation switch 31$i$, the distress call transmitter and antenna 33$i$ and 35$i$, and any other component that may require power to operate.

The decryption chip 15i is preferably reprogrammable, using a reprogramming signal that is preferably a combination of two or more proprietary, narrowly defined frequencies. When an encrypted signal ES, such as a television signal, with a well-defined carrier frequency is received, the decryption chip first determines if the received signal is associated (1) with a group of channels the receiver is authorized to receive or (2) with another channel, belonging to a group of what are characterized as unauthorized channels. If the received signal is associated with a channel that belongs to group 1 (authorized channels), the decryption chip is enabled, as discussed above, if the SATPS antenna location L(21i) is within the region R($L_i$;$d_i$). The decryption chip 15i is not enabled if the SATPS antenna location L(21i) is not within the region R($L_i$;$d_i$), or if the signal is not associated with a channel that is authorized for this site. If a channel is to be added to, or deleted from, the group of authorized channels, a reprogramming signal is applied at a reprogramming terminal 16i to change the group of authorized channels. Preferably, the reprogramming terminal 16i is either hidden or is arranged to resemble some other terminal, such as a power supply terminal. Reprogramming may be performed using circuitry and/or software already built into the decryption chip 15i or the SATPS receiver/processor, or this reprogramming may be performed using a separate channel adjustment module 18i.

Figure 3:
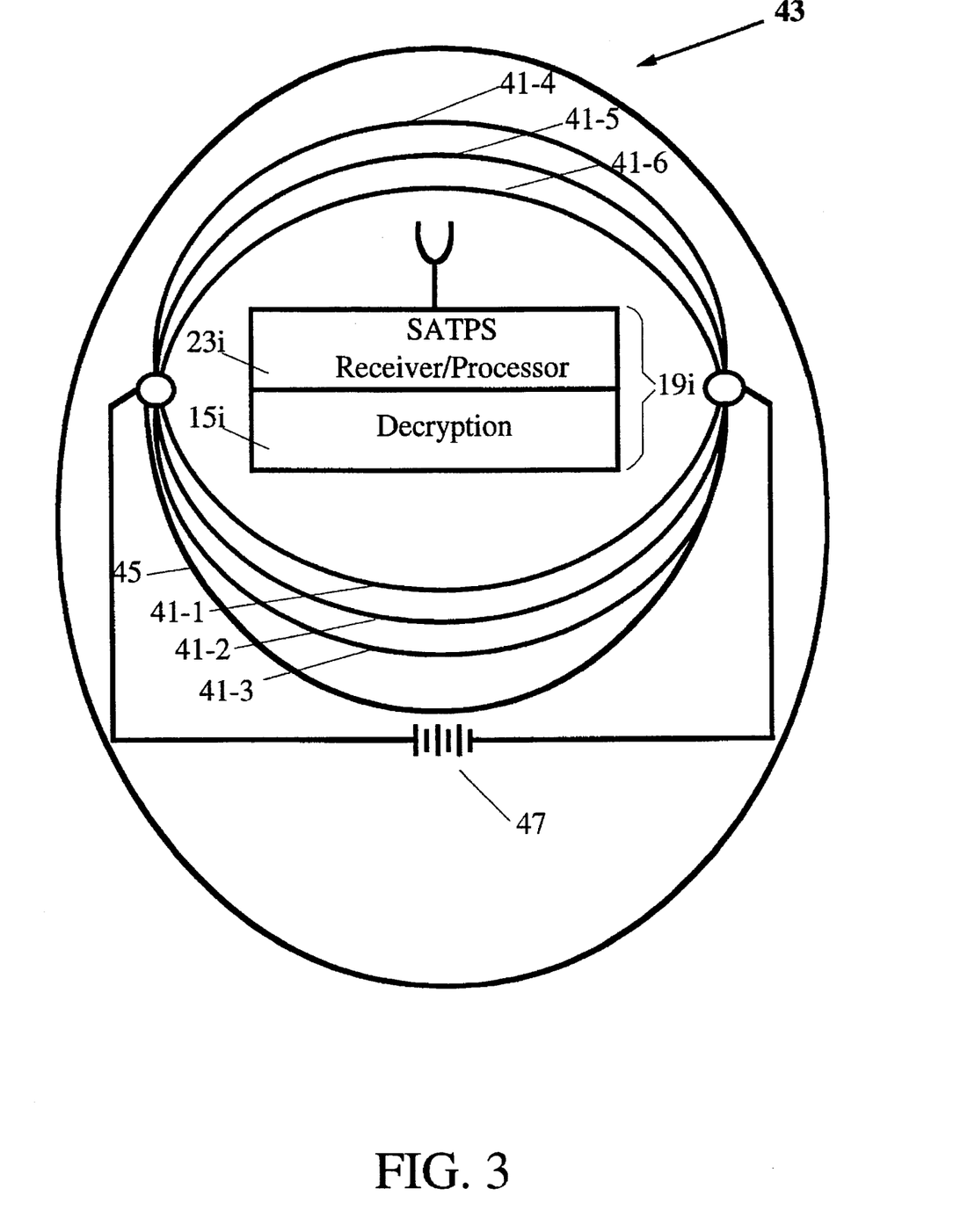
FIG. 3 is a schematic view of disassembly protection apparatus that disables the decryption chip and/or of an SATPS receiver/processor used in the invention, if an attempt is made to disassemble or tamper with a module containing these two active elements.

Preferably, the module 19i is fabricated so that, if any attempt is made to disassemble the module, the decryption chip 15i and the SATPS receiver/processor 23i (referred to collectively as the active elements) are disabled or destroyed. This might be arranged in the following manner. Pack the SATPS receiver/processor 23i and the decryption chip compactly into a small volume V, preferably no more than 5 cm×5 cm×2 cm. Immerse the active elements in an epoxy solution, together with N longitudinally oriented, closely spaced current traces 41-n (n=1, 2, ..., N; N greater than some large number, such as 30) that form a cocoon 43 surrounding the active elements, and allow the epoxy to solidify. Preferably, the solidified epoxy solution should resist formation of comprehensible X-ray images or tomographic images of its interior so that it is difficult or impossible to determine the components or circuitry inside the solidified epoxy solution without disassembling this mass. Adjacent current traces in groups of three (e.g., 41-1, 41-2, 41-3; or 41-4, 41-5, 41-6) are arranged in parallel with a fourth current trace 45. The fourth current trace 45 is inside, and not part of, the cocoon 43, and this fourth current trace passes through a current-sensitive part of the decryption chip 15i and/or through a current-sensitive part of the SATPS receiver/processor 23i, as indicated in FIG. 3.

The two ends of each of the four current traces 41-1, 41-2, 41-3 and 45 are directly or indirectly connected to two terminals of a power supply 47, which can serve the decryption chip 15i, the SATPS antenna 21i and receiver/processor 23i as well. The current traces 41-1, 41-2 and 41-3 are configured so that, if at least one of these current traces passes current, the amount of current passing through the fourth current trace 45 is small enough that no burn-out occurs in the current-sensitive parts of the active elements 15i and 23i. However, if the no current passes through any of the current traces 41-1, 41-2 and 41-3, the amount of current passing through the fourth current trace is more than sufficient to burn out a current-sensitive part of the active elements 15i and 23i. If an attempt is made to disassemble the epoxied volume containing the active elements 15i and 23i surrounded by the cocoon 43 of current-carrying traces 41-n, this attempt will likely result in disruption of current in three associated current-carrying traces, such as 41-1, 41-2 and 41-3, through severing of these current traces. This will produce above-normal current in the fourth associated current-carrying trace 45 and will produce burn-out in the active elements 15i and 23i, preferably rendering the decryption chip 15i useless and rendering the SATPS receiver/processor 23i inoperable. The invention is not limited to the method illustrated in FIG. 3 for disablement or destruction of the decryption chip 15i and/or the SATPS receiver/processor 23i, if an attempt is made to disassemble the module 19i.

An SATPS-determined location may have a statistically defined inherent uncertainty or inaccuracy of the order of 10–30 meters. This associated inaccuracy can be reduced, and the system accuracy enhanced, by use of differential SATPS (DSATPS) signals that compare the SATPS signals actually received by an SATPS receiver/processor with known location with the SATPS signals that should be received as a function of time at this receiver/processor. This DSATPS receiver/processor then determines the difference signals between the known SATPS signals and the SATPS signals actually received and provides these difference signals for differential correction of the SATPS signals received by a nearby mobile or stationary SATPS station. Use of differentially corrected SATPS signals by this nearby SATPS station can reduce the inherent location inaccuracy for this nearby SATPS station to 2–3 meters or less. The SATPS receiver/processor 23i is, optionally, provided with the capability to receive, analyze and incorporate DSATPS signals in the determination of the present location of the SATPS antenna 21i.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code.

The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, ..., 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, op. cit., pp. 17–90. The information from this reference is incorporated by reference herein.

I claim:

1. A method for assuring the location integrity of a decryption chip used to receive and decrypt encrypted signals received from an encrypted signal source, the method comprising the steps of:

providing a signal receiver that can receive an encrypted signal from an encrypted signal source;

providing an SATPS antenna and SATPS receiver/processor connected to the antenna, to receive and process SATPS signals from at least three SATPS signal sources and to determine and issue a receiver/processor output signal indicating the location coordinates of the present location L of the SATPS antenna;

providing a decryption chip that, in an enabled state, receives an encrypted signal, decrypts this signal and issues the decrypted version of this encrypted signal as a decryption chip output signal; and providing an enablement module that contains the location coordinates ($x_i$, $y_i$, $z_i$) of a selected location $L_i$, that contains a diameter $d_i$ of a selected region $R(L_i;d_i)$ surrounding the location $L_i$, that receives the SATPS receiver/processor output signal, and that determines whether the SATPS antenna present location L is within the selected region $R(L_i;d_i)$, where the enablement module issues an output signal enabling the decryption chip only if the SATPS antenna present location L is within the selected region $R(L_i;d_i)$.

2. The method of claim 1, further comprising the step of causing said enablement module to transmit a distress signal that includes the location coordinates of said SATPS antenna present location L when the SATPS antenna present location L is not within the selected region $R(L_i;d_i)$.

3. The method of claim 1, further comprising the step of automatically causing at least partial destruction of at least one of said decryption chip and said SATPS receiver/processor if a user of said chip attempts to disassemble or modify said decryption chip or said SATPS receiver/processor.

4. The method of claim 1, further comprising the step of providing location adjustment means, connected to at least one of said decryption chip and said SATPS receiver/processor, that allows said location coordinates of said selected location $L_i$ to be changed to the location coordinates corresponding to another selected location $L_j$.

5. A method for assuring the location integrity of a decryption chip used to receive and decrypt encrypted signals received from an encrypted signal source, the method comprising the steps of:

providing a signal receiver that can receive an encrypted signal from an encrypted signal source;

providing an SATPS antenna and SATPS receiver/processor connected to the antenna, to receive and process SATPS signals from at least three SATPS signal sources and to determine and issue a receiver/processor output signal indicating the location coordinates of the present location L of the SATPS antenna;

providing a decryption chip, connected to the signal receiver, that, in an enabled state, receives an encrypted signal ES, determines a channel corresponding to this encrypted signal, determines if the receiver is authorized to receive the encrypted signal channel, and, if the encrypted signal channel appears on a list of authorized channels the signal receiver is authorized to receive, the decryption chip decrypts this signal ES and issues the decrypted version of this encrypted signal as a decryption chip output signal; and providing an enablement module that contains the location coordinates ($x_i$, $y_i$, $z_i$) of a selected location $L_i$, that contains a diameter $d_i$ of a selected region $R(L_i;d_i)$ surrounding the location $L_i$, that receives the SATPS receiver/processor output signal, and that determines whether the SATPS antenna present location L is within the selected region $R(L_i;d_i)$, where the enablement module issues an output signal enabling the decryption chip only if the SATPS antenna present location L is within the selected region $R(L_i;d_i)$.

6. The method of claim 5, further comprising the step of providing encryption signal channel adjustment means that allows said authorized channel list to be changed by at least one of the actions of (i) adding an encryption signal channel to said list of authorized channels and (ii) removing an encryption signal channel from said list of authorized channels.

7. The method of claim 5, further comprising the step of causing said enablement module to transmit a distress signal that includes the location coordinates of said SATPS antenna present location L when the SATPS antenna present location L is not within the selected region $R(L_i;d_i)$.

8. The method of claim 5, further comprising the step of automatically causing at least partial destruction of at least one of said decryption chip and said SATPS receiver/processor if a user of said chip attempts to disassemble or modify said decryption chip or said SATPS receiver/processor.

9. The method of claim 5, further comprising the step of providing location adjustment means, connected to at least one of said decryption chip and said SATPS receiver/processor, that allows said location coordinates of said selected location $L_i$ to be changed to the location coordinates corresponding to another selected location $L_j$.

10. Apparatus for assuring the location integrity of a decryption chip used to receive and decrypt encrypted signals received from an encrypted signal source, the apparatus comprising:

a signal receiver that can receive an encrypted signal from an encrypted signal source;

an SATPS antenna and SATPS receiver/processor connected to the antenna, to receive and process SATPS signals from at least three SATPS signal sources and to determine and issue a receiver/processor output signal indicating the location coordinates of the present location L of the SATPS antenna;

a decryption chip that, in an enabled state, receives an encrypted signal, decrypts this signal and issues the decrypted version of this encrypted signal as a decryption chip output signal; and an enablement module that contains the location coordinates ($x_i$, $y_i$, $z_i$) of a selected location $L_i$, that contains a diameter $d_i$ of a selected region $R(L_i;d_i)$ surrounding the location $L_i$, that receives the SATPS receiver/processor output signal, and that determines whether the SATPS antenna present location L is within the selected region $R(L_i;d_i)$, where the enablement module issues an output signal enabling the decryption chip only if the SATPS antenna present location L is within the selected region $R(L_i;d_i)$.

11. The apparatus of claim 10, wherein said enablement module transmits a distress signal that includes the location coordinates of said SATPS antenna present location L when the SATPS antenna present location L is not within the selected region $R(L_i;d_i)$.

12. The apparatus of claim 10, wherein at least one of said decryption chip and said SATPS receiver/processor is automatically at least partially destroyed if a user of said chip attempts to disassemble or modify said decryption chip or said SATPS receiver/processor.

13. The method of claim 10, further comprising location adjustment means, connected to at least one of said decryption chip and said SATPS receiver/processor, that allows said location coordinates of said selected location $L_i$ to be changed to the location coordinates corresponding to another selected location $L_j$.

14. Apparatus for assuring the location integrity of a decryption chip used to receive and decrypt encrypted signals received from an encrypted signal source, the apparatus comprising:

- a signal receiver that can receive an encrypted signal from an encrypted signal source;

- an SATPS antenna and SATPS receiver/processor connected to the antenna, to receive and process SATPS signals from at least three SATPS signal sources and to determine and issue a receiver/processor output signal indicating the location coordinates of the present location L of the SATPS antenna;

- a decryption chip, connected to the signal receiver, that, in an enabled state, receives an encrypted signal ES, determines a channel corresponding to this encrypted signal, determines if the receiver is authorized to receive the encrypted signal channel, and, if the encrypted signal channel appears on a list of authorized channels the signal receiver is authorized to receive, the decryption chip decrypts this signal ES and issues the decrypted version of this encrypted signal as a decryption chip output signal; and

- an enablement module that contains the location coordinates $(x_i, y_i, z_i)$ of a selected location $L_i$, that contains a diameter $d_i$ of a selected region $R(L_i;d_i)$ surrounding the location $L_i$, that receives the SATPS receiver/processor output signal, and that determines whether the SATPS antenna present location L is within the selected region $R(L_i;d_i)$, where the enablement module issues an output signal enabling the decryption chip only if the SATPS antenna present location L is within the selected region $R(L_i;d_i)$.

15. The apparatus of claim 14, further comprising channel adjustment means that allows said authorized channel list to be changed by at least one of the actions of (i) adding an encryption signal channel to said list of authorized channels and (ii) removing an encryption signal channel from said list of authorized channels.

16. The apparatus of claim 14, wherein said enablement module transmits a distress signal that includes the location coordinates of said SATPS antenna present location L when the SATPS antenna present location L is not within the selected region $R(L_i;d_i)$.

17. The method of claim 14, wherein at least one of said decryption chip and said SATPS receiver/processor is automatically at least partially destroyed if a user of said chip attempts to disassemble or modify said decryption chip or said SATPS receiver/processor.

18. The method of claim 14, further comprising location adjustment means, connected to at least one of said decryption chip and said SATPS receiver/processor, that allows said location coordinates of said selected location $L_i$ to be changed to the location coordinates corresponding to another selected location $L_j$.

* * * * *